Figure 1:
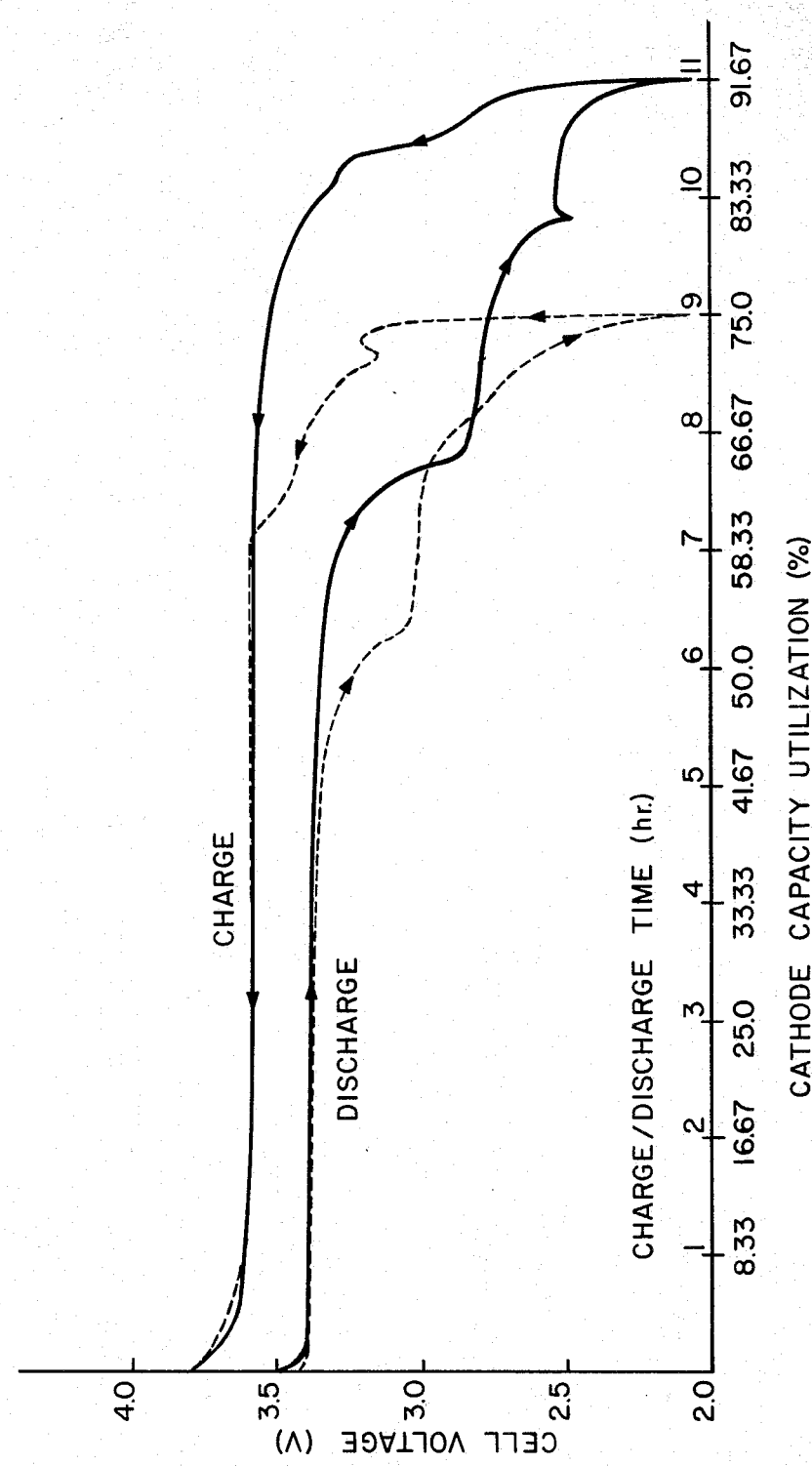

United States Patent [19]

Bowden et al.

[11] Patent Number: 4,515,875
[45] Date of Patent: May 7, 1985

[54] INORGANIC RECHARGEABLE NON-AQUEOUS CELL

[75] Inventors: William L. Bowden, Nashua, N.H.; Arabinda N. Dey, Needham, Mass.

[73] Assignee: Duracell Inc., Bethel, Conn.

[21] Appl. No.: 509,690

[22] Filed: Jun. 30, 1983

Related U.S. Application Data

[63] Continuation-in-part of Ser. No. 330,128, Dec. 14, 1981, abandoned.

[51] Int. Cl.³ .................... H01M 6/14; H01M 4/36
[52] U.S. Cl. .................... 429/196; 429/218; 429/220
[58] Field of Search ............ 429/101, 103, 194, 196, 429/199, 218, 220

[56] References Cited

U.S. PATENT DOCUMENTS

| 3,508,966 | 4/1970 | Eisenberg | 429/199 |
| 3,567,515 | 3/1971 | Maricle et al. | 429/218 |
| 4,330,601 | 5/1982 | Dey | 429/105 |
| 4,362,794 | 12/1982 | Abraham | 429/196 |
| 4,367,268 | 1/1983 | Behl | 429/196 |
| 4,409,303 | 10/1983 | Bowden | 429/105 |

Primary Examiner—Brian E. Hearn
Assistant Examiner—Stephen J. Kalafut
Attorney, Agent, or Firm—Ronald S. Cornell; Israel Nissenbaum

[57] ABSTRACT

A totally inorganic non-aqueous rechargeable cell having an alkali or alkaline earth metal anode such as of lithium, a sulfur dioxide containing electrolyte and a discharging metal halide cathode, such as of $CuCl_2$, $CuBr_2$ and the like with said metal halide being substantially totally insoluble in $SO_2$ and admixed with a conductive carbon material.

7 Claims, 2 Drawing Figures

INORGANIC RECHARGEABLE NON-AQUEOUS CELL

The invention described herein was made in the course of, or under, a contract with the U.S. Department of Energy.

This is a continuation-in-part of application Ser. No. 330,128 filed Dec. 14, 1981, now abandoned.

This invention relates to non-aqueous rechargeable cells and more particularly to such cells having lithium anodes and sulfur dioxide electrolyte solvents.

The rechargeability of non-aqueous cells has been generally hampered by the presence within such cells of materials which react either upon standing or during cell discharge and which are not capable of being completely regenerated from their reaction products during cell charging. Organic electrolyte solvents utilized in non-aqueous cells, such as propylene carbonate which forms anode metal carbonates and propylene gas, are the most common of the incompletely regenerable materials. However, such organic electrolyte solvents are generally indispensible for proper operation of the non-aqueous cells particularly cells having sulfur dioxide electrolyte solvent/cathode depolarizers, since sulfur dioxide alone is a poor solvent for electrolyte salts except for certain esoteric salts such as clovoborates and gallium halides as described in U.S. Pat. Nos. 4,020,240 and 4,177,329 respectively. More common salts such as metal halides; e.g., LiBr and tetrachloroaluminates e.g., $LiAlCl_4$ are either insoluble in $SO_2$ alone or form complexes therewith whereby cell performance is drastically deteriorated. Utilization of the aforementioned esoteric salts in order to provide a totally inorganic cell has been effective in increasing the rechargeable efficiency of such cells. However, some of the esoteric salts, while effective, are nevertheless exceedingly costly whereby construction of an economical cell therewith has been generally precluded. Furthermore, during the increased cycle life in such cells a second source of deterioration of the cells was discovered. In cells containing the inorganic sulfur dioxide electrolyte and inert carbon cathodes said cathodes tended to lose their structural integrity. The formation and depletion of cell reaction products within the cathode causes detrimental expansion and contraction of the carbon cathode which expansion and contraction could not be accommodated without structural damage to the cathode.

It is an object of the present invention to provide an improved totally inorganic non-aqueous cell which is readily and efficiently rechargeable.

It is a further object of the present invention to provide such cell with readily obtainable and economical components.

Figure 2:
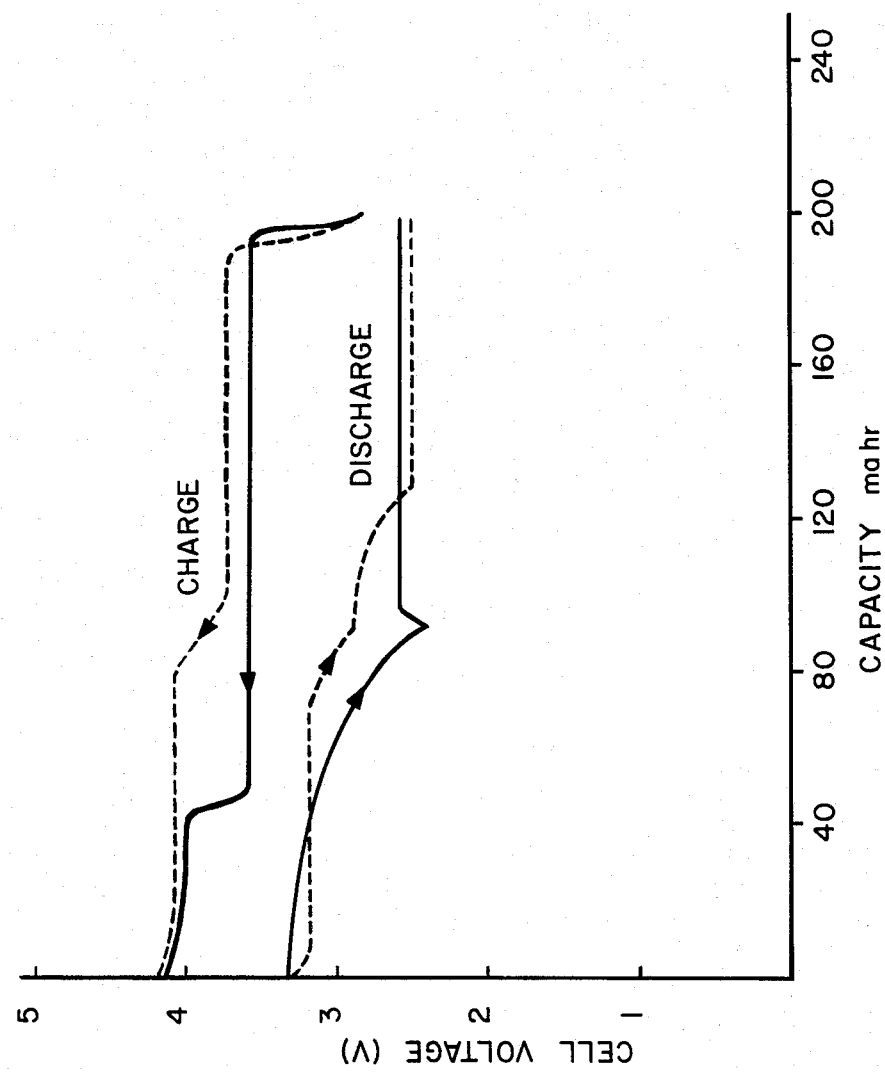

These and other objects, features and advantages of the present invention will be more readily apparent from the following discussion and the drawings in which:

FIG. 1 is a discharge-charge graph of cells made in accordance with the present invention and FIG. 2 is a discharge-charge graph of another embodiment of a cell made in accordance with the present invention.

Generally, the present invention comprises an efficiently rechargeable totally inorganic non-aqueous cell containing an anode of an alkali or alkaline earth metal preferably lithium, including alloys and mixtures, a totally inorganic electrolyte comprised of sulfur dioxide with an electrolyte salt soluble therein dissolved therein, and an insoluble (in said sulfur dioxide) metal halide cathode having a conductive carbon material therein, which cathode discharges during cell operation in preference to the $SO_2$. Metal salts such as $FeCl_3$, $MoCl_5$ and the like which are soluble in $SO_2$ are accordingly not within the purview of the present invention. Admixture of such metal halides with conductive carbon materials, as opposed to the metal powder conductive materials described in U.S. Pat. No. 3,493,433 permits substantially greater utilization of the metal halide whereby the obtainable primary capacity is enhanced.

In a preferred embodiment of the present invention the cell is comprised of a lithium anode and a copper chloride ($CuCl_2$) cathode. It has been discovered that the previously unsuitable but economical salts such as $LiAlCl_4$ (which while soluble in the $SO_2$ detrimentally complexed therewith) could be effectively utilized in the cells of the present invention. This utility is believed to be attributable to the fact that $SO_2$ in the cell is not discharged and that its complexing with the salt does not as a result affect cell capacity or performance. It is therefore preferred from an economic standpoint, to utilize tetrachloroaluminate salts such as $LiAlCl_4$ as the electrolyte salt. This does not however preclude the utilization of other salts such as $LiGaCl_4$, $Li_2B_{10}Cl_{10}$ and the like as electrolyte salts provided that they are soluble in the $SO_2$ without the necessity for organic cosolvents. Preferably such salts are anode metal salts.

Though metal halides such as copper chloride have been utilized as cathodes in non-aqueous cells, such cells have invariably contained organic solvents in which the halides such as copper chloride were at least partially soluble. As a result such cells were considered to be unsatisfactory because of the inherent problem of self discharge caused by the solvated metal halide. However, the very deficiency of $SO_2$, that it is a poor solvent without organic cosolvents, renders the present invention operable since the metal halides such as copper chloride are substantially totally insoluble in $SO_2$ alone.

The metal halide cathode is made from a mixture of the metal halide and conductive carbon materials such as graphite or carbon black and a binder such as polytetrafluoroethylene. The materials are preferably compressed together and the preferred percentage of the metal halide is between 60% to 80% by weight with the remainder being the conductive material (about 30 to 10%) and binder (about 10%). The higher the intended rate the greater the amount of conductive materials.

In prior art cells such as in U.S. Pat. No. 3,493,433, rechargeable metal halide containing cells have generally contained metal powder conductors in the cathodes thereof. It was believed that such metal conductors, particularly of the same metal of the metal halide enhanced capacity with reformation of the metal halide on recharge. However, the presence of such metal conductors in fact severely restricted cell capacity. In accordance with the present invention the carbonaceous additives have been of substantially greater utility and efficacy in conjunction with metal halides.

In order to more clearly illustrate the efficacy of the present invention, the following examples are presented. It is understood that such examples are for illustrative purposes only and that specifics contained therein are not to be construed as limitations on the present invention. Unless otherwise indicated all parts and percentages are by weight.

EXAMPLE 1

Flat cells were made with each having two anode layers of lithium foil (1×1.6×0.020" or 2.54×4.06×0.05 cm) pressed onto a copper foil (0.020" or 0.05 cm), about 25 grams of 0.5M LiGaCl$_4$—SO$_2$ electrolyte, and four grams of a compressed (20,000 psi or 1406 Kg/cm$^2$) mixture of 60% CuCl$_2$, 30% graphite and 10% polytetrafluoroethylene (PTFE) on an expanded nickel grid as the cathode (1×1.6×0.065" or 2.54×4.06×0.16 cm). The anode layers and cathode were individually heat sealed inside sheets of microporous polypropylene and the anode layers placed one on each side of the cathode. Two cells were each discharged at a rate of 2 mA/cm$^2$ or 40 mA and thereafter charged in a cycling regimen with a 2 volt cutoff for charging. The theoretical capacity of the cells was 480 mAhrs (limiting cathode capacity. Anode capacity was about 1800 mAhrs.). FIG. 1 depicts the cycling efficiency of the cells with one cell shown by the solid line after the 4th cycle and the broken line indicating the second cell after the 70th cycle (a short circuit in the first cell prematurely ended its cycling life after about 60 cycles). The second cell was cycled 101 times but with diminished capacity and delivered about 67 times the CuCl$_2$ capacity on voltage cycling and 18 anode turnovers. The average discharge voltage is relatively high at about 3.3 volts as compared to the discharge voltage of SO$_2$ of about 2.9 volts.

EXAMPLE 2

A cell was made as in Example 1 but with a 1M LiAlCl$_4$—SO$_2$ electrolyte and a 2 gram cathode. The cell was discharged at the same rate of 2 ma/cm$^2$ and charged at 1 ma/cm$^2$ with discharge-charge cycling being on a timed basis of 4.9 hr. discharge and 9.8 hr. charge. The cell underwent 23 cycles and FIG. 2 depicts the curves for the first cycle (solid line) and twenty-first cycle (broken line) with the cell actually improving over continued cycling.

It is understood that the above examples are for illustrative purposes only and that changes may be made in cell construction and components without departing from the scope of the present invention as defined in the following claims.

What is claimed is:

1. A totally inorganic rechargeable non-aqueous electrochemical cell comprising, a cathode, an anode of alkali or alkaline earth metal, and an electrolyte comprised of an electrolyte salt dissolved in sulfur dioxide, with said electrolyte being free of organic solvents; characterized in that said cathode is comprised of at least 60% by weight of a cathode active metal halide insoluble in said sulfur dioxide, said metal halide being admixed with a conductive carbon material and wherein said metal halide discharges in preference to said sulfur dioxide.

2. The cell of claim 1 wherein said metal halide is CuCl$_2$ or CuBr$_2$.

3. The cell of claim 1 wherein said anode is comprised of lithium.

4. The cell of claim 1 wherein said electrolyte salt is a gallium halide salt.

5. The cell of claim 1 wherein said electrolyte salt is an aluminum halide salt.

6. A totally inorganic rechargeable non-aqueous electrochemical cell comprising a lithium anode and an electrolyte consisting essentially of LiAlCl$_4$ dissolved in SO$_2$ characterized in that said cell contains a cathode comprised of at least 60% by weight of CuCl$_2$ with said CuCl$_2$ being admixed with a conductive carbon material and wherein said CuCl$_2$ discharges in preference to said sulfur dioxide.

7. A totally inorganic rechargeable non-aqueous electrochemical cell comprising a lithium anode and an electrolyte consisting essentially of LiGaCl$_4$ dissolved in SO$_2$ characterized in that said cell contains a cathode comprised of at least 60% by weight of CuCl$_2$ with said CuCl$_2$ being admixed with a conductive carbon material and wherein said CuCl$_2$ discharges in preference to said sulfur dioxide.

* * * * *